United States Patent

Schwanhäuser

(10) Patent No.: US 9,037,412 B2
(45) Date of Patent: May 19, 2015

(54) MECHANISM TO MONITOR VEHICLE MILES TRAVELED

(71) Applicant: Thomas Dominik Schwanhäuser, Frankfurt am Main (DE)

(72) Inventor: Thomas Dominik Schwanhäuser, Frankfurt am Main (DE)

(*) Notice: Subject to any disclaimer, the term of this patent is extended or adjusted under 35 U.S.C. 154(b) by 0 days.

(21) Appl. No.: 14/081,236

(22) Filed: Nov. 15, 2013

(65) Prior Publication Data

US 2014/0142850 A1 May 22, 2014

(30) Foreign Application Priority Data

Nov. 16, 2012 (DE) .................... 20 2012 104 439 U

(51) Int. Cl.
*G01C 22/00* (2006.01)
*G07C 5/00* (2006.01)
*G07C 5/08* (2006.01)

(52) U.S. Cl.
CPC ............... *G01C 22/00* (2013.01); *G07C 5/008* (2013.01); *G07C 5/085* (2013.01)

(58) Field of Classification Search
CPC .... G01C 22/00; G01C 21/00; G01C 21/3484; G07C 5/008; G07C 5/085; G07C 5/0808
USPC ........... 701/537, 35, 32.5, 2, 29.1; 360/73.01
See application file for complete search history.

(56) References Cited

U.S. PATENT DOCUMENTS

| | | | |
|---|---|---|---|
| 6,181,995 B1* | 1/2001 | Luper et al. ................ 701/521 |
| 6,408,233 B1* | 6/2002 | Solomon et al. ............ 701/29.3 |
| 7,610,128 B2* | 10/2009 | O'Connor et al. ........... 701/32.5 |
| 2001/0020204 A1* | 9/2001 | Runyon et al. ............... 701/35 |
| 2002/0133271 A1 | 9/2002 | McDermott et al. |
| 2004/0064247 A1 | 4/2004 | Davis |
| 2006/0015221 A1* | 1/2006 | Sarkar et al. ................. 701/2 |
| 2009/0118899 A1 | 5/2009 | Carlson |
| 2012/0203398 A1* | 8/2012 | Roberts et al. .............. 701/1 |
| 2012/0262283 A1 | 10/2012 | Biondo et al. |
| 2012/0296513 A1* | 11/2012 | Ramseyer ................. 701/29.6 |
| 2013/0144667 A1* | 6/2013 | Ehrman et al. ............... 705/5 |
| 2013/0208893 A1* | 8/2013 | Shablygin et al. ........... 380/277 |
| 2013/0307707 A1* | 11/2013 | Creech ...................... 340/994 |
| 2013/0332004 A1* | 12/2013 | Gompert et al. ............. 701/1 |

FOREIGN PATENT DOCUMENTS

DE 19923060 A1 11/2000
DE 10008352 A1 8/2001

OTHER PUBLICATIONS

German Search Report dated Jan. 15, 2014 from corresponding German Application No. 20 2012 104 439.0; 5 pgs.

* cited by examiner

*Primary Examiner* — Helal A Algahaim
*Assistant Examiner* — Shardul Patel
(74) *Attorney, Agent, or Firm* — Maier & Maier, PLLC

(57) ABSTRACT

A device for checking the running performance of a motor vehicle, which can have at least the following components: a system for measuring a distance of a motor vehicle which is integrated in a motor vehicle, a vehicle communication system for wireless data transmission, where the system is identifiable by a unique identification number of the motor vehicle, and data may be transmitted from the vehicle to a receiver, a stationary database system for storing and providing data, which is equipped with a receiver that allows communication with the in-vehicle communication system, and an interface which allows stationary and mobile communication terminal system.

12 Claims, 1 Drawing Sheet

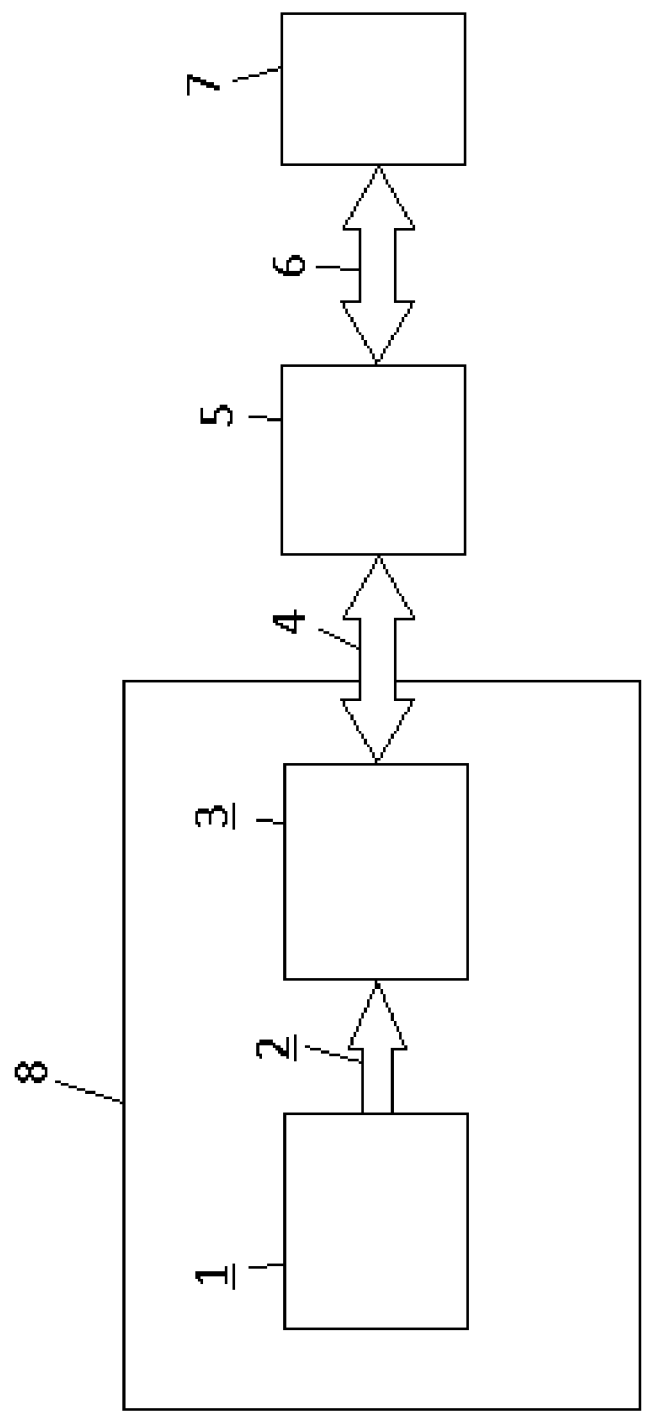

MECHANISM TO MONITOR VEHICLE MILES TRAVELED

BACKGROUND

The present technology approach for protecting against mileage counter forgery is primarily orientated towards improving the security of the odometer itself.

A common example for increasing security is to protect the hardware of the odometer by special physical measures. The usage of a Trusted Platform Module (TPM) could protect against software manipulation. However, the negative aspect of those methods is that the actual mileage count can still be manipulated if someone has physical access to the device.

Because of that there is a constant competition between the automobile industry, which is trying to create equipment that is forgery and tamper proof, versus attackers who regularly find new ways to interfere with new protection mechanisms.

Present technology shows various methods for the documentation of electronic log books. The DE 100 08 352 A1 and DE 199 23 060 A1 describe systems that log driving activity and transmit it via a wireless connection. Additionally one is able to identify the driver of the vehicle during this process. This process allows keeping electronic driving logbooks outside of the actual vehicle. However this does not allow one explicitly to obtain the data of the mileage counter. The identification is fixed on the specific driver not the vehicle.

The DE 20 2008 03 describes a system that allows obtaining positioning data of a vehicle via cellular mobile connections. However this system likewise has the issue that the identification is not tied to a set vehicle. Here the identification occurs via a mobile device that can also be switched or removed. Additionally the positioning details are retrieved via GPS—the retrieved data and therefore the mileage counter is not entirely accurate due to the present incorrectness of GPS-Systems.

SUMMARY

The following invention proposes a system that allows one to prevent mileage counter manipulation.

In order to do this the vehicle is connected to an integrated communication system. The information retrieved from the system is then sent to a stationary database. This information can then be read from the database via the Internet in order to check the actual mileage usage.

The objective of the proposed invention is the provisioning of a system that can proof a given mileage count for its accuracy.

In order to do this the system needs to be able to trace the mileage count and make it available to entitled recipients. An important factor in this aspect is that the retrieving the data is convenient. Access to the data should only be possible if one holds a specific identification number for the vehicle.

The security of the collected data must be guaranteed so that access by a third party is prohibited. Besides that it needs to be ensured that the mileage data is really produced from a specific vehicle. It must be guaranteed at all times that the mileage count data is complete.

BRIEF DESCRIPTION OF THE DRAWINGS

Advantages of embodiments of the present invention will be apparent from the following detailed description of the exemplary embodiments. The following detailed description should be considered in conjunction with the accompanying FIGURES in which:

FIG. 1 is an exemplary diagram of a mechanism to monitor vehicle miles traveled.

DETAILED DESCRIPTION OF THE INVENTION

All this can be solved via the system referred to in Claim 1, see also FIG. 1. Within a vehicle (8), a communication system (3) and a mileage counter (1), which is implemented in the form of an odometer, are integrated. Mileage counter and communication system are connected via a data circuit (2) in order to allow the mileage counter to send its status to the communication system. In turn the communication system sends its data to a database (5) via a wireless connection (4). The database then allows the measured data from the mileage counter to be made available to users that hold a fixed or mobile device (7) via a data interface (6), which can for example be Internet-based.

The stored travel distances in the database (5) can be allocated to one specific vehicle (8). This is possible as each vehicle (8) holds a precise identification number. Examples of possible identification numbers could be the serial identification number or chassis plate number of the vehicle. Ideally the identification number of the vehicle (8) is allocated and noted on its engine. This creates an important advantage as the main reason for analyzing the mileage count is to calculate the wearing of the motor. When a potential buyer wishes to retrieve an accurate mileage status of a set vehicle (8), he can then request the identification number of this specific vehicle (8). By using either a stationary or mobile device (7) he can now retrieve the mileage information from the database (5) and compare this with what is actually shown on the dashboard of the vehicle (8). The above situation is possible as the database system (5) is set up with similar functions as with a webserver. The stationary or mobile device (7) that is needed can be a conventional PC, or mobile phone with an internet connection.

In a specific beneficial variant of the invention, the communication system (3), which is integrated in the vehicle (8), is a mobile handheld device. Due to the wide coverage of present mobile networks one can be assured that data can be transferred at most locations. The communication system (3) allows the user to create an interval for which the actual log data is gathered. This interval can be based either by time between the intervals or the set kilometers/miles the vehicle (8) has driven during this time.

The lower the interval is chosen, the more accurate the mileage counter's reading becomes and the better a plausibility analysis can be carried out with this data. In the case that the data cannot be transmitted to the database (5), for example because the vehicle is currently in an area without mobile coverage, the accumulated data must be buffered. To do so, the communication system (3) provides a large enough memory storage that will be able to hold a sufficient amount of data. As soon as connectivity is restored, the previously collected and buffered data is transmitted to the database (5). It can be beneficial to choose larger intervals for transmitting the data in order to save cost on the data transmission.

The saved data from the mileage counter could also reveal personal information of the vehicle's (8) driver, whom may not wish for this information to be made public. This could also be a reason to choose a larger interval for collection of the data. A larger interval makes it more difficult to draw conclusions on the driver's activities. Because the identification occurs upon the vehicle (8) and not a specific driver, it is not possible to allocate persons specifically to log entries. However, it is still important to protect the transmitted data in a way that only people can access it that possess the valid identification number. Hence an invented system is especially advantageous if the communication system (3) is able to encrypt the transmitted data. This can be ensured via a symmetrical encryption algorithm, for example an algorithm from the Advanced Encryption Standard (AES).

It would also be advantageous if it can be ensured that data is really sent from a specific communication system (3). In order to ensure this the communication system (3) needs to authorize itself. A conceivable manner to achieve this would be if the communication system (3) sends together with the current mileage count the last count it has transmitted. Due to the fact that this information can only be known by the communication system (3) when communication is encrypted, the identity of the system can be proofed. If enough system resources are available, an alternative approach could be to use cryptographic methods for authentification. For example, a challenge-response-scheme based on Rivest-Shamir-Adleman-Cryptosystems (RSA) could be used.

The communication system (3) sends the logged information to a database that in turn has a data interface (6), which could be connected to the Internet. The database (5) saves the received information. Ideally the system does not allow any changes to the above data once saved. In order to later review the data for its integrity, the data is marked with a checksum.

Users can access the system with either a stationary or mobile communications device (7) to retrieve the car usage information. However this is only possible if they hold the correct identification number. Ideally the database (5) is able to show its derived data in a graphical form in order for users to understand the analysis promptly.

For security reasons the users should be able to check that they are communicating with the correct database (5). Hence the database (5) is secured with a digital certificate, for example based on the standard X.509.

What is claimed is:

1. An appliance to control the actual miles traveled by a vehicle, comprising:
    a system that measures the distance traveled of a vehicle captured by an odometer, which is integrated into the vehicle;
    a mobile communication system for wireless transmission, which is integrated into the vehicle and which is identifiable by a unique identification number and can transmit data from the vehicle to a recipient;
    a stationary database system equipped with a retrieval interface to facilitate communication with the communication system integrated in the vehicle and performing storage and retrieval of the data;
    an interface that enables the stationary and mobile communication system to store and retrieve vehicle-specific data from and to the stationary database system when the identification number associated to a specific vehicle is provided; and
    a storage sub-system into saves distance travel data at at least one of configurable time and distance intervals,
    wherein the communication system can access the storage sub-system to measure the distance traveled, retain said distance travel data from the vehicle in a memory storage when the communication system cannot communicate with the stationary database, and transmit the retained data when communication is restored.

2. The appliance according claim 1, wherein the communication system uses cellular mobile telephony technology.

3. The appliance according to claim 1, wherein the communication system allows an encrypted transmission and uniquely authenticates itself.

4. The appliance according to claim 3, wherein the communication system implements the encrypted data transmission with an AES and that the secure authentication is implemented with a challenge-response-mechanism using RSA.

5. The appliance according to claim 1, wherein the stationary database system communicates with the communication system and establishes an encrypted connection to the communication system and to ensure its identity by authentication.

6. The appliance according to claim 1, wherein the stationary database system holds for each communication system, an individual record, which is related to the unique identification number of the vehicle and which is used to store the data of the communication system.

7. The appliance according to claim 1, wherein the communication system transmits the captured travel data to the database system at at least one of configured time and distance traveled intervals.

8. The appliance according to claim 1, wherein the system prohibits a later change to the saved travel data and ensures the integrity of the data with a checksum.

9. The appliance according to claim 1, wherein the stationary database system makes the travel data of the vehicle available via an interface to a computer network when the identification number is provided.

10. The appliance according to claim 1, wherein the stationary database system displays the data associated to a communication system with a graphical interface and that it can authenticate itself against its users.

11. The appliance according to claim 1, wherein the database signs the travel data associated to a specific identification number in a legally complaint way.

12. Usage of an appliance according to claim 1 as a system to monitor vehicle miles traveled.

* * * * *